May 3, 1966   D. L. CHILDS   3,249,295
METHOD FOR SEPARATING LIQUID MIXTURES
Original Filed July 27, 1959   2 Sheets-Sheet 1
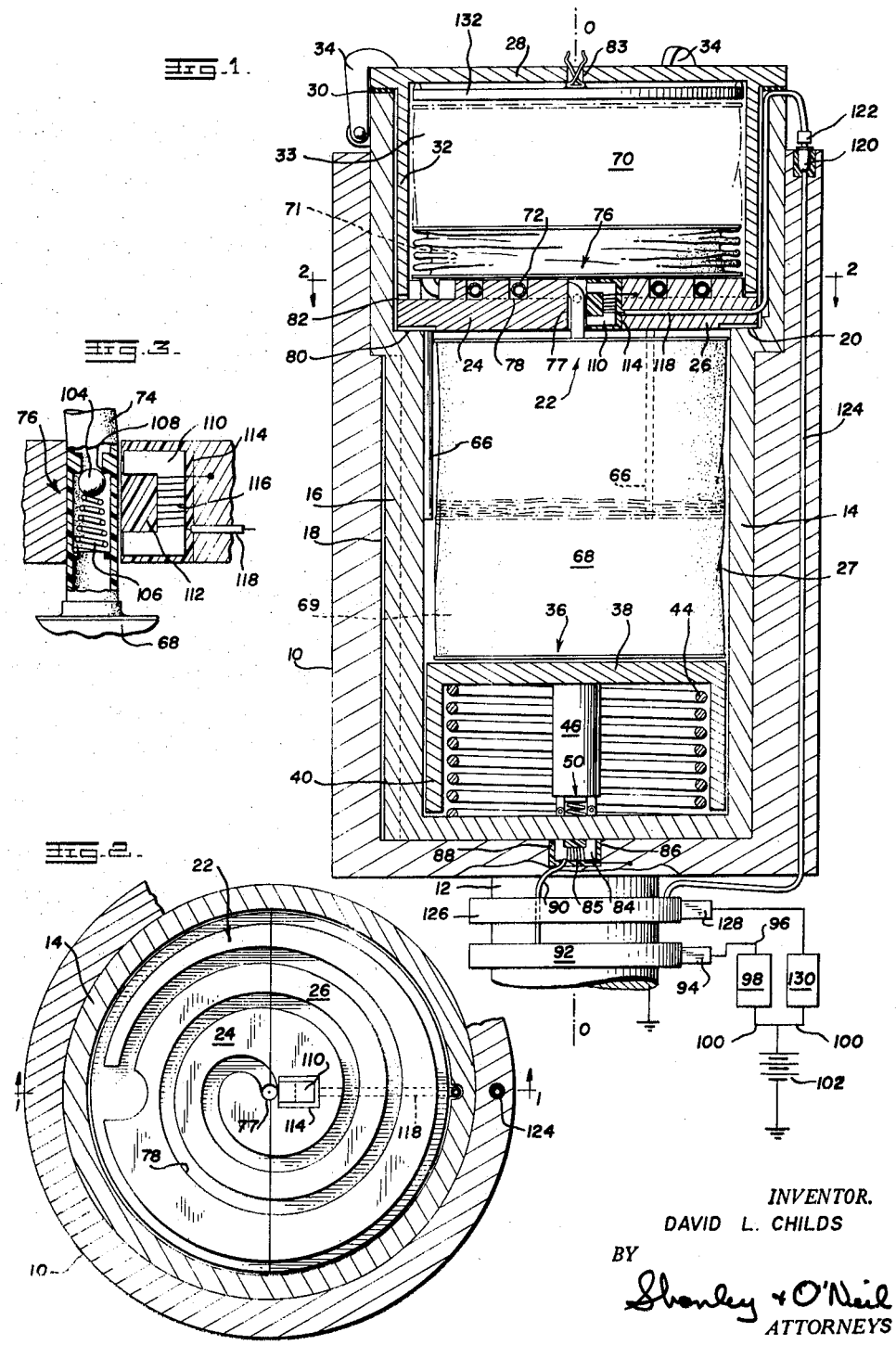
INVENTOR.
DAVID L. CHILDS
BY
Shanley & O'Neil
ATTORNEYS

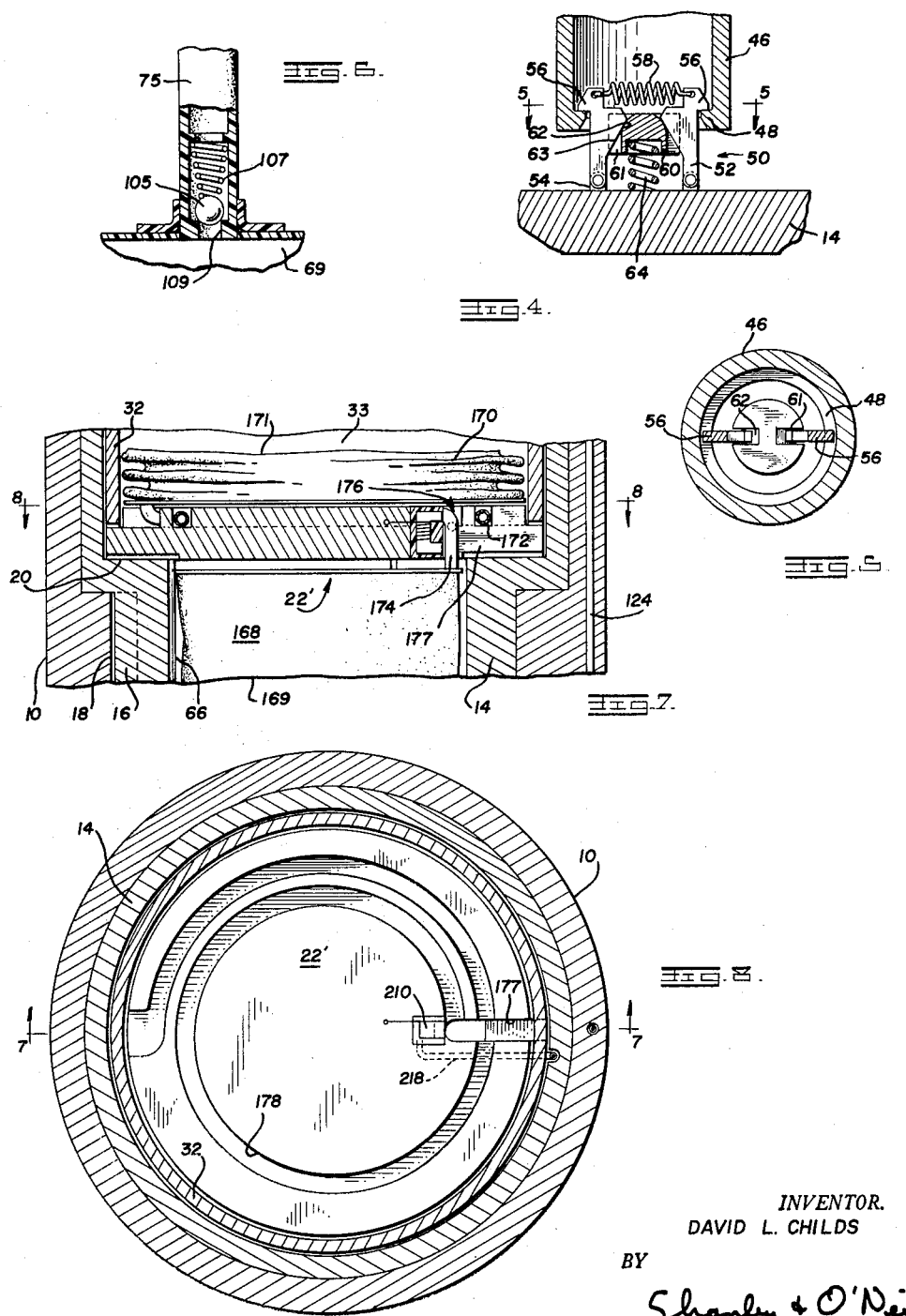

3,249,295
METHOD FOR SEPARATING LIQUID MIXTURES
David L. Childs, Birmingham, Mich., assignor of one-third to Giovanni Raccuglia, Prospect, Ky., and one-third to James J. Shanley, Bethesda, Md.
Original application July 27, 1959, Ser. No. 829,599, now Patent No. 3,133,881, dated May 19, 1964. Divided and this application Mar. 10, 1964, Ser. No. 354,815
6 Claims. (Cl. 233—20)

This patent application is a division of applicant's co-pending parent patent application Serial No. 829,599, filed July 27, 1959, now Patent No. 3,133,881.

The present invention relates to the centrifugal separation of liquids. More particularly, the present invention relates to a new method for separating liquids by centrifugation and storing separated components. Further the present invention involves a new method for collecting and centrifuging liquids and for storing and dispensing separated components.

The invention has utility in the collection and centrifugal separation of a variety of liquid mixtures having immiscible components and in the separate storage of separated components, particularly in the handling of biological materials. Examples of the handling of biological materials enhanced by this invention are the preparation of nutrient media, tissue fractionation, and the research fractionation of milk and the separation of virus and bacteria therefrom. Perhaps the chief utility of the invention is in collection and separation of whole blood and storage of blood components, and the invention will be illustrated by way of example in this connection.

As is well known, whole blood is a fluid tissue comprised of a variety of solid particles suspended in colloidal plasma. Chief among the suspended particles are the red cells, the white cells, and the platelets. Suspension of the solid particles is maintained by vascular circulation in a parent organism. Whole blood is not a true dispersion, as evidenced by the spontaneous sedimentation of quiescent blood.

Accordingly, it is not difficult to effect a gross separation of several of the formed elements of blood from each other and from the plasma by centrifugation, which is nothing more than accelerated sedimentation. Such separation has great utility in a number of biological applications, such as plasmapheresis, relief of thrombocytopenia and hemophilia, and so on.

For the past twenty-five years or so, it has been widespread practice to collect fresh donor blood and to store it in admixture with an anticoagulant such as acid citrate dextrose solution or other calcium complexing agents, for reinfusion when needed. However, a number of difficulties have attended this procedure. In the first place the equilibrium state of cell destruction and resynthesis which exists in the human body does not obtain in stored blood. The various components of stored whole blood have different survival times, and the useful life of stored blood for certain purposes is largely limited to these survival times. For example, the platelets have an ordinary survival time of only a few days.

More recently, it has been found that platelet survival can be greatly extended, with good viability, if the platelets are separately stored, as in a simple gelatin solution and at reduced temperature. Not only is the survival time of certain blood components extended by separate storage, but also the remaining components of ordinarily long survival may be separately stored for long periods without special treatment other than refrigeration.

Another difficulty arising from the use of whole blood stored with anticoagulant is encountered in those therapies in which an excessive volume of anticoagulant is contraindicated. In such cases, partial experimental evidence indicates that the prompt separation of the blood components may remove or greatly reduce, where possible in respect to other conditions, the need for anticoagulant. The platelets may be roughly considered to be coagulating agents, inasmuch as upon lysis they liberate accelerators for the transformation of prothrombin to thrombin and for the conversion of fibrinogen to fibrin by thrombin. Hence, the separation of blood components followed by reconstitution minus platelets should result in the production of a blood which has less tendency to coagulate in the absence of anticoagulants.

These and other applications render the fractionation of blood of great importance.

In the past, separation has been achieved largely by one of three methods. In the earliest method, blood obtained by phlebotomy was collected in a closed and evacuated donor bottle and then transferred from the bottle to a centrifuge. This method had the advantage that the only equipment needed at the time of phlebotomy was a simple donor bottle and donor kit. The centrifuge could be centrally located and could handle the contents of a number of bottles during the time consumed by a single phlebotomy. Separation was followed by bulk storage and/or packaging of the separated fractions for therapeutic use. Simple as this method was, it suffered from the great disadvantages that asepsis could be maintained only with the greatest difficulty and that the frothing induced during handling increased the danger of embolism.

In recent years, a system for blood separation has been developed in which fresh blood passes directly from the donor through a closed system including a centrifuge. This new system has largely overcome the problem of turbulence and provides closed-system sterility, but it has necessitated the use of costly equipment which can be employed in conjunction with only a single phlebotomy at a time. Unless donors are meticulously scheduled so that a plurality of the same blood type are processed sequentially, then this equipment must be cleaned after each phlebotomy to prevent the mixing of blood types.

Still more recently, the fractionation of blood has been carried out on a commercial scale using plastic bags in which the red cell fraction and the plasma fraction are separated either by sedimentation or by centrifuging. The plasma fraction is then expelled from the bag by squeezing. However, this plastic bag technique as presently practiced has many inconveniences, principally that the segregation of the two fractions after separation is a slow and burdensome procedure.

The present invention provides a method which is simple and therefore inexpensive while at the same time it has the advantages of the closed system asepsis and freedom from excessive handling of the blood. These results are achieved by providing a method in which a receptor bottle has a plurality of compartments with provision for transferring a separated component from one compartment to another during centrifuging, the fractionation and segregation of components being accomplished by the design and position of the parts and their manipulation during centrifuging.

It is an important object of the present invention to provide a method for the centrifugal separation of liquids which will permit separation of the liquids into two or three components in a closed system during centrifuging.

Another important object of the present invention is the provision of a method for the centrifugal separation of liquids in which flexible bag components are centrifuged around an axis of rotation passing through at least one bag component.

Another important object of the present invention is the provision of a method for the centrifugal separation of liquids in which the volumetric capacity of a component of the system determines the extent of segregation.

Other objects and advantages of the present invention will become apparent from a consideration of the following description, taken in conjunction with the accompanying drawings, in which:

FIGURE 1 is a view generally in section taken along the line 1—1 of FIGURE 2 with some parts in elevation of a system capable of carrying out the present invention;

FIGURE 2 is a view in cross section taken on the line 2—2 of FIGURE 1;

FIGURE 3 is an enlarged detail view of the valve and valve actuator shown in FIGURES 1 and 2;

FIGURE 4 is an enlarged detail view of the mechanical latch and magnetic release shown in FIGURE 1;

FIGURE 5 is a view in section taken on the line 5—5 of FIGURE 4;

FIGURE 6 is an enlarged detail view of a modified form of valve;

FIGURE 7 is a view in section taken along the line 7—7 of FIGURE 8 showing a modification of the system illustrated in FIGURES 1-4, inclusive, capable of carrying out a variant of the method of the invention; and FIGURE 8 is a view in cross section taken on the line 8—8 of FIGURE 7.

Referring now to the drawings in greater detail, and specifically to the variant of FIGURES 1-5, inclusive, there is shown a system adapted to carry out the method of the present invention. Centrifuge element 10 is in the form of an open top chuck carried on centrifuge drive shaft 12, the latter being connected to a source of power for rotating the centrifuge element 10 about the axis O—O, which axis coincides with the major axis of centrifuge element 10. Removably carried within centrifuge element or chuck 10 is a centrifuge cup 14 which fits snugly within chuck 10 so as to be readily withdrawable but is prevented from rotating relative to chuck 10 by provision of keying element 16 integral with cup 14 and slideably received in keyway 18 of chuck 10. Cup 14 has an internal annular ledge 20 which supports a dividing wall or partition indicated generally at 22 which is made up of two separable portions 24 and 26. Cup 14 comprises a cover 28 carrying a resilient sealing washer or gasket 30 and an annular depending flange 32, the lower end of which rests on and maintains partition 22 in place on shoulder 20. A plurality of fastening means 34 are movable into and out of cover fastening position, these fastening members being retained in cover fastening position against centrifugal forces by compression of resilient gasket 30.

In the lower portion of cup 14, there is a follower indicated generally at 36 having a flat bottle supporting plate 38 and an annular depending flange 40 which is snugly received in sliding relation by the internal wall surfaces of the lower portion of cup 14. Within the hollow interior of follower 36 as thus formed and urging the follower upwardly is a spring 44. Depending from the lower surface of plate 38 is a restraining member 46 made up of a hollow cylinder having a latch engaging upwardly facing annular shoulder 48 at the lower end.

Referring more particularly to FIGURE 4, a latch device is indicated generally at 50 having duplicate latch members 52 pivoted at their lower ends in lugs 54 carried by the bottom of cup 14, latch members 52 including catch or detent elements 56 engageable in latching relationship with annular shoulder 48 of restraining member 46. A linking spring 58 pulls the upper ends of latch members 52 toward one another. A magnetic armature 60 has grooves 61 receiving latch members 52, the bottoms of grooves 61 presenting cam surfaces 62 engaging cam surfaces 63 on latch elements 52. Armature 60 is upwardly urged by spring 64 to cause cam surfaces 62 to press latch members 52 outwardly against the action of spring 58 into latching position. Spring 64 is designed so as not to urge armature 60 higher than the position shown in FIGURE 4 whether or not restraining member 46 is in latching position. It will be apparent that downward movement of armature 60 will permit spring 58 to pull latch members 52 out of latching engagement with shoulders 48 of restraining member 46 and upward movement of magnetic armature 60 will urge these members into latching position when restraining member 46 is in its lowermost position. The coacting angles of the cam surfaces 61 and 63 are such that downward movement of restraining member 46 will move the latching members 52 against the action of spring 64 until they are in latching position in engagement with shoulder 48.

Ribs 66 may be formed projecting out of the inside wall surface of the upper portion of main compartment 27 in cup 14, these ribs being so dimensioned that their lower ends form a stop to control desired or extreme upward movement of follower 36.

Main chamber 27 of cup 14 is designed to receive a flexible blood bottle or bag of any desirable shape when empty so long as it can be received within compartment 27 when filled. The usual 500 cc. capacity blood bag would be suitable. This blood bag may be entirely flexible or may have one or two rigid end walls. It is necessary that the side walls be collapsible. Chamber 33 is designed to receive a smaller bag element than bag element 68 and such a bag element 70 with flexible or rigid end walls is shown. As is usual practice with some types of blood bags, the two bag elements are joined by a severable flexible tubing 72, the portion 74 of this tubing adjacent bag element 68 opening into the main compartment 69 formed by the interior of bag element 68, on axis O—O. In the present embodiment, tubing portion 74 incorporates a spring-pressed ball valve indicated generally at 76, normally urged into closed position. The means for closing this tubing portion 74 can take several forms while still fulfilling its function in the present combination. Partition 22 has on its upper surface a convoluted groove 78 which snugly receives the coils of tubing 72. Tubing 72 can open into second compartment 71, formed by the interior of bag element 70, at the lower portion of the peripheral extremity or in any other location convenient for storing the coiled tubing without kinking.

Although cup 14 is peripherally sealed by gasket 30, provision is made for fluid intercommunication between main chamber 27 and second chamber 33. Thus, a small slot 80 in partition 22 in the region of shoulder 20 and a similar slot 82 in the lower edge of depending annular flange 32 assure free flow of fluid between main chamber 27 and secondary chamber 33 at points farthest removed from the axis O—O of rotation. A bleeder port 83 on axis O—O in cover 28 may be used to place the entire interior of cup 14 in communication with the atmosphere.

Since the present invention calls for operations of valve 76 and/or latch means 50 at a desired time during centrifugation, remote control means for these purposes are provided. Magnetic armature 60 which operates latching means 50 is moved downwardly at the desired moment during centrifuging by energization of the electromagnet 84. This magnet with its electrical winding 85 is imbedded in a hardened plastic material 86 in a recess 88 in the bottom wall of centrifuge chuck 10. One end of the electrical winding is grounded on the centrifuge chuck which, together with the shaft 12, is electrically conductive and grounded. The other lead 90, insulated from the centrifuge structure, goes to a collector ring 92 rigidly mounted on and insulated from shaft 12. A collector brush 94 and lead 96 go to a timer switch control box 98 and thence through a lead 100 to one terminal of a battery 102 having its other terminal grounded. At least the portion of centrifuge cup 14 between electromagnet 84 and magnetic armature 60 is formed of nonmagnetic material. Thus when timer switch 98 operates to complete the electrical circuit, electromagnet 84 pulls armature 60 into its lowermost position thereby unlatching latch member 46 and permitting spring 44 to urge follower member 36 upwardly against the bottom of bag 68.

Valve 76 is made up of a magnetic ball 104 urged by spring 106 against valve seat 108. Provision is made for operating this valve at any desired time by means of an electromagnet 110 imbedded in the plastic 112 in a recess 114 of member 26 of partition 22. It is to be noted from an inspection of the drawings that portion 74 of tubing 72 which incorporates valve 76 is snugly received by opening 77 in partition 22 so as to position the valve accurately relative to the electromagnet and to position the opening of tube portion 74 into bag 68 on axis O—O. One end of the electrical winding 116 on the magnet is grounded on partition 22, which together with centrifuge cup 14 is electrically conductive and grounded through chuck 10. The other end of the electrical winding 116 is carried through an insulated cable 118 out of cup 14 to a jack 120 on chuck 10 through a jack plug 122 to present a readily disconnectable electrical connection between the electrical circuit of the centrifuge cup and the electrical circuit of the centrifuge chuck. An insulated cable 124 carries the circuit down through chuck 10 to a collector ring 126 rigidly but insulatingly mounted on shaft 12. A brush 128 carries the circuit to a timer switch control box 130 and from there to ground through conduit 100 and battery 102. The timer switches 98 and 130 can be of any conventional type which can be independently set to hold a cricuit open or closed for set periods of time or to close and open a circuit at set time intervals.

In use, the bottle made up of bag sections 68 and 70 is used for a phlebotomy in the same manner as the conventional plastic bags and except where valve 76 is present, bag sections 68 and 70 can be the conventional plastic bags of the type described in Gardner, Howell & Hersch in the J. Lab. & Clin. Med. 43:196–207, 1954 and by Klein, Arnold, Earl & Wake in New England Journal of Medicine, 254:1132–1133, 1956.

The blood collects in the main compartment 69 formed by the interior of bag 68 and cannot flow into the second compartment 71 formed by the interior of bag 70 because of valve 76. Main compartment 69 usually includes a liquid anti-coagulant and this and the blood usually bring the quantity of liquid in bag section 68 to around 500 cc. in volume. The bag entry means for the blood (not shown) is sealed off in any desirable manner depending upon its type and the bag is ready to be placed in centrifuge cup 14. At this time, cover 28 and partition 22 are removed from the cup to accommodate bag section 68 in cup chamber 27. Where latch means 50 is not present, bag section 68 is forced down against follower 36 and the action of spring 44 until partition 22 can be inserted and rest on shoulders 20. In the insertion of partition 22, tubing portion 74 is carefully placed in the opening shown between the halves of the partition. The tubing 72 is arranged in the convoluted groove 78 and bag section 70 is arranged in cup chamber 33 in such a way that it can expand, it being empty and deflated at this time. The depending annular flange 32 on cover 28 holds the partition in its proper position and fasteners 34 can be turned into locking position when gasket 30 is compressed. Jack plug 122 is inserted in jack 120 and the equipment is ready for the centrifuging process.

The centrifuging speed and time is such as to separate the red cell fraction and the plasma fraction, the latter preferably containing the platelets in effective quantity. After a given period of time, determined by experience, a separation of the red cell fraction and the plasma fraction has been effected and at this point timer 130 closes the electrical circuit to energize magnet 110. The magnetic flux path causes ball 104 to move away from valve seat 108 against the action of spring 106. Spring 44 acting on follower 38 thereupon causes a progressive collapsing of bag section 68 to reduce the volume of the compartment 69 by ejecting the plasma fraction through tubing 72 into second compartment 71. Air bleeder port 83 permits bag section 70 to increase in size and collect the plasma fraction but of course fluid from chamber 33 must move into chamber 27 to fill the space left by collapsing bag element 68. A filler member 132 of variable thickness can be used in the upper portion of cup chamber 33 to determine the final volume of second compartment 71. This filler member 132 can be varied in thickness in accordance with the amount of whole blood originally in bag section 68 and the percentage of red cells in the blood being centrifuged. In this manner, when the desired volume of plasma has been transferred to the second compartment 71, the action of spring 44 will no longer have any effect because the hydrostatic pressure, exclusive of earth's gravitational force, in the two bags will be balanced. In such case, rib 66 need not be long enough to interfere with upward action of follower 36. When transfer of the platelet fraction has taken place, the required time being determined by experience, timer 130 cuts off electrical energy to magnet 110 and spring 106 closes valve 104.

If only red cell pack and plasma fraction segregation are desired, the bag can be removed from the centrifuge at this time and placed in storage either with the sections connected together or with the tubing sealed in two places and severed in between. If platelet recovery is desired, centrifugation is continued at a suitable speed for separating a platelet pack on the side walls of second compartment 71. In this type operation, timer 130 can be set so that valve 104 stays open after the plasma is transferred and while the platelets are being separated. When a platelet pack has been collected, the centrifuge is stopped and the bag sections are removed. As soon as tubing section 74 moves away from the vicinity of magnet 110, valve 104 closes. As the bag elements are taken out of cup 14, plasma is transferred by gravity back into the main compartment to form a reconstituted blood by moving partition section 26 to bring energized magnet 110 into proximity to valve 76 to open the valve. If the plasma fraction is to be separately stored, valve 104 remains closed during platelet separation and the plasma is withdrawn from second compartment 71 in any suitable manner.

Instead of the volume of centrifuge cup chamber 33 determining the amount of plasma transferred, the lower end of rib 66 can be utilized to accomplish this purpose so long as chamber 33 is large enough to take all the plasma fraction.

Where latch members 46 and 50 are used, the procedure can be the same as above except that bag section 68 need not be forced into cup chamber 27. In this operation timer 98 is set to operate after the centrifuge cup is loaded and closed and preferably not later than the point in time at which timer 130 operates to open valve 104. The operation of timer switches 98 and 130 can be synchronous.

As pointed out later, it may in some cases be advisable to use a liquid such as water in centrifuge cup 14 in this method of operation in order to take up the difference in volume between the available space in cup chambers 27 and 33 and the volume of liquid in the main compartment 69. In the case of water, the specific gravity of the plastic material and the blood fractions being greater than that of water, the bag sections will be moved by centrifugal force to their extreme outer positions relative to axis O—O. Port 83 may be omitted.

Where restraining member 46 and latching member 50 are used, valve 76 can be omitted entirely. In such case, timer switch 130 and magnet 110 are present but not used. It will be obvious that at the proper moment during centrifuging when the plasma fraction is to be transferred timer switch 98 operates to energize magnet 84 and this releases follower 36. Thereupon spring 44 proceeds to transfer the plasma until the volume of the second compartment in bag element 70 is filled or until follower 36 comes up against the lower end of rib 66, whichever by design happens first.

In the operation described in the last paragraph, the absence of a valve in tubing section 74 adjacent the main compartment in bag section 68 may cause some inconvenience in handling and operating the device. It may be desirable in such instance to use a non-magnetic spring-pressed valve as shown in FIGURE 6 which is urged into closing position against pressure in the main compartment of bag section 68 with a force sufficient to prevent blood from passing into tubing 72 during handling of the two bag sections but with this spring force being such that action of follower spring 44 will force plasma fraction through the valve. The valve parts in FIGURE 6 corresponding to those in FIGURE 3 have been given the same reference numerals plus one.

The structure of the system illustrated in FIGURES 7 and 8 is the same as that illustrated in FIGURES 1–5, inclusive, except in the region of the partition in the centrifuge cup and the point at which liquid is ejected from the main compartment. To simplify the drawing and the description only those portions of the system of FIGURES 7 and 8 are illustrated which differ in structure and function from the system of FIGURES 1–5, inclusive. To further simplify the description, the same reference numerals are used in FIGURES 7 and 8 as those in FIGURES 1–5, inclusive, but where the structure is different 100 is added to each numeral or the numeral is primed.

It will be apparent that instead of the outlet from bag section 168 being on axis O—O in FIGURES 7 and 8, this outlet and therefore section 174 of tubing 172 is at the outermost periphery of the upper part of bag section 168. This makes it possible to form partition 22' in one piece with a slot 177 for receiving tubing section 176. A filler block (not shown) may be used in slot 177 to hold tubing section 176 against radial movement due to centrifugal forces during centrifuging. The opening in bag section 170 in which tubing 172 terminates is at the periphery of the bottom portion of this bag although it could be otherwise located.

Operations with the variant of FIGURES 7 and 8 are the same as those of FIGURES 1–5, inclusive, except as now pointed out. Since tubing 174 opens into the periphery of bag section 168 at a point farthest removed from axis O—O, centrifugal force will eject red cell fraction out of the main compartment 169 when valve 176 is opened after separation has taken place and segregation is desired. If follower 36 is latched down at this time, red cell fraction will continue to be ejected until the hydrostatic pressure in the second compartment 171 at the entry opening equals that at the corresponding opening to tubing section 174. In the meantime, atmospheric pressure entering through bleeder port 83 will cause bag section 168 to collapse. The volume of chamber 33 can be designed so that this balance of pressures takes place when all the red cells and a safety layer of plasma fraction have been transferred into second compartment 171.

Preferably, follower 36 is used so that a more positive bag control will be present and so that the volume of compartment 171 will determine the extent of transfer rather than the balancing of weights of liquid against one another. Of course, in this type operation the lower ends of rib 66 are above the highest point reached by follower 36 during the transferring action and therefore serve only to limit extreme movement of follower 36 when the cup 14 is unloaded.

When the opening of tubing 172 into compartment 171 is at the extreme periphery of compartment 70, the fact that this point is farther removed from axis O—O than the opening of tubing section 174 into main compartment 169 will act to trap red cells against migration back into the plasma fraction in compartment 169 when transfer has been completed.

It may be desirable in some cases in respect to both variants to add a small amount of water to the interior of centrifuge cup 14 to prevent isolated portions of the bag walls from being subjected to highly concentrated stresses and to keep the tubing from being kinked or pinched. Tubing with no liquid in it may be collapsed by hydrostatic pressure in the water during centrifuging but the centrifugal hydrostatic pressure in the blood component entering the tubing will reinflate it due to resilience of the tubing and the greater specific gravity of the blood components relative to the water. Of course, where spring 44 is also acting on main bag sections 68 or 168, the additional hydrostatic pressure within the blood component entering the tubing will also act to reinflate the tubing. Also important, this slight amount of water around the periphery of main compartment 27 will facilitate peeling of the bag wall away from the centrifuge cup wall as the follower 36 moves upwardly.

In both described variants, chamber 27 is large enough with follower 36 in its lowermost position to hold a full blood bag and in this respect where follower 36 is unlatched after the centrifuge cup 14 is loaded and cover 28 locked in place, the resilience of spring 44 produces a chamber above the follower 36 which precisely accommodates bag section 68 or 168 during centrifuging. The red cell pack in normal human blood occupies about 45% of the volume normally occupied by whole blood. When the usual volume of anticoagulant is taken into account, the red cell fraction plus a safety layer of plasma occupy about 45% of the volume of the entire liquid. It follows that stops 66 permit follower 36 to collapse bag section 68 to reduce the volume of main compartment 69 to this amount when stops 66 are used for this purpose in the embodiment of FIGURES 1–6, inclusive. Where the volume of chamber 33 is used to limit the transfer of a blood component in either modification, ribs 66 can be omitted. This is especially the case in the embodiment of FIGURES 7 and 8 where centrifugal force ejects the red cell fraction and a safety layer of plasma so long as there is space available in second compartment 171, as dictated by the volume of chamber 33 or the balance of hydrostatic pressures.

The environment and the practice described in copending application Serial No. 802,398, filed March 27, 1959, now Patent 3,190,546, issued June 22, 1965 to Giovanni Raccuglia, David L. Childs and James J. Shanley correspond to that of the present case. Thus in respect to the variant illustrated in FIGURES 1–6, inclusive, plasma is transferred to the second compartment 71 until only red cell fraction and a safety core of plasma remain in main compartment 68. This means that not more than 55% of the volume of the whole blood originally in main compartment 69 is transferred into second compartment 71. A smaller percentage down to as low as 25% of the total initial whole blood volume may be all that is transferred into the second compartment but in general the maximum amount of plasma, consistent with freedom from red cells, is transferred. It is only because of the variations in the amount of blood initially present in main compartment 69 and the variations in red cell content from one donor to another that a reasonable safety fraction of plasma must remain with the red cell fraction. As pointed out above, the volume of chamber 33 may be varied to accommodate these two factors by inclusion of a filler disk 132 of the proper thickness, a plurality of these disks of graduated thicknesses being available for this purpose.

The terminology "concentric to an axis" as used in this specification and claims in referring to the side walls of a container or bottle is intended to embrace any wall structure which coincides with a continuous surface generated by points rotating in circles in an infinite number of planes normal to the axis, with the centers of the circles lying along the axis of revolution, each such plane passing through the continuous surface only once.

The terms "revolve" and "revolution" are used herein to embrace both the turning of a body around an axis outside the body and the turning of a body about an axis passing through the body while the terms "rotate" and "rotation" are used to designate only turning of a body around an axis passing through the body. Where the term "density" is used in respect to the liquids being handled, apparent density is included within the meaning of the term since, as has been pointed out earlier, blood comprises solid particles suspended in colloidal plasma.

The presence of some gas in the bag sections initially will not adversely influence the methods of the present invention.

Although the present invention has been described in connection with preferred variants, it is to be understood that variations may be resorted to without departing from the spirit of the invention, as those skilled in this art will readily understand. Such variations are to be considered within the purview and scope of the invention as defined by the appended claims.

What is claimed is:
1. The method of separating liquid mixtures into fractions of greater density and lesser density comprising the steps of:
 (a) providing a centrifuge having a container holding member revolvable around an axis of revolution,
 (b) providing a container separate from the centrifuge having a first compartment containing a discrete body of liquid mixture and a second compartment, the compartments being interconnected by continuous passageway means,
 (c) placing the container in the container holding member of the centrifuge, with both compartments held by the member for synchronous revolution around the axis of revolution, and with the discrete body of liquid mixture confined entirely to the first compartment,
 (d) revolving the container holding member and both of the compartments synchronously around the axis of revolution for a period of time until the discrete body of liquid mixture while confined entirely to the first compartment forms within the first compartment a first fractional liquid body of more dense fraction resting against a wall of the first compartment remote from the axis of revolution and a second fractional liquid body of less dense fraction supported by the first fractional liquid body and between the first fractional liquid body and the axis of revolution,
 (e) then while continuing to revolve the container holding member and both compartments around the axis of revolution utilizing hydrostatic pressure within one fractional liquid body to transfer liquid fraction from the one fractional liquid body out of the first compartment through the continuous passageway means into the synchronously revolving second compartment,
 (f) continuing to revolve the container holding member and both compartments around the axis of revolution and continuing transfer of liquid fraction through the continuous passageway means until hydrostatic pressure in the liquid in the second compartment adjacent the passageway means including the effect of the liquid in the passageway means exactly balances hydrostatic pressure in the liquid in the first compartment adjacent the passageway means, and
 (g) collecting and holding all the transferred liquid fraction within the second compartment for a period during centrifuging.

2. The method as set out in claim 1 in which the liquid fraction transferred is less dense fraction.

3. The method as set out in claim 1 in which the liquid fraction transferred is more dense fraction.

4. The method of separating liquid mixtures into fractions of greater density and lesser density comprising the steps of:
 (a) providing a centrifuge having a container holding member revolvable around an axis of revolution,
 (b) providing a container separate from the centrifuge having a first compartment containing a discrete body of liquid mixture and a second compartment, the compartments being interconnected by continuous passageway means,
 (c) placing the container in the container holding member of the centrifuge, with both compartments held by the member for synchronous revolution around the axis of revolution, and with the discrete body of liquid mixture confined entirely to the first compartment,
 (d) revolving the container holding member and both of the compartments synchronously around the axis of revolution for a period of time until the discrete body of liquid mixture while confined entirely to the first compartment forms within the first compartment a first fractional liquid body of more dense fraction resting against a wall of the first compartment remote from the axis of revolution and a second fractional liquid body of less dense fraction supported by the first fractional liquid body and between the first fractional liquid body and the axis of revolution,
 (e) then while continuing to revolve the container holding member and both compartments around the axis of revolution exerting force on a wall portion of the first compartment to reduce the volumetric liquid capacity of the first compartment to thereby transfer liquid fraction from the one fractional liquid body out of the first compartment through the continuous passageway means into the synchronously revolving second compartment, and
 (f) collecting and holding all the transferred liquid fraction within the second compartment for a period during centrifuging.

5. The method of claim 4 in which the liquid fraction transferred is less dense fraction.

6. The method of claim 4 in which the liquid fraction transferred is more dense fraction.

References Cited by the Examiner

UNITED STATES PATENTS

| | | | |
|---|---|---|---|
| 1,132,814 | 3/1915 | Weston et al. | 233—20 |
| 1,296,399 | 3/1919 | Johansson | 233—27 |
| 1,534,604 | 4/1925 | Ter Meer | 233—47 |
| 1,695,990 | 12/1928 | Altpeter | 233—47 |
| 2,533,806 | 12/1950 | Holzapfel. | |
| 2,636,646 | 4/1953 | Olsen | 220—20.5 X |
| 2,661,150 | 12/1953 | Abbott. | |
| 2,678,159 | 5/1954 | Ellis | 233—27 X |
| 2,702,034 | 2/1955 | Walter. | |
| 2,822,126 | 2/1958 | Cohn | 233—46 X |
| 2,848,995 | 8/1958 | Ryan | 128—214 |
| 2,906,451 | 9/1959 | Tullis et al. | 233—27 |
| 3,064,647 | 11/1962 | Earl. | |
| 3,096,283 | 7/1963 | Hein | 233—20 |

M. CARY NELSON, *Primary Examiner.*
ROBERT F. BURNETT, *Examiner.*